(12) United States Patent
Stancovski

(10) Patent No.: US 8,487,627 B2
(45) Date of Patent: Jul. 16, 2013

(54) STIMULATION AND INTENSIFICATION OF INTERFACIAL PROCESSES

(76) Inventor: Victor Stancovski, Groton, CT (US)

( * ) Notice: Subject to any disclaimer, the term of this patent is extended or adjusted under 35 U.S.C. 154(b) by 893 days.

(21) Appl. No.: 12/631,209

(22) Filed: Dec. 4, 2009

(65) Prior Publication Data

US 2010/0141212 A1 Jun. 10, 2010

Related U.S. Application Data

(60) Provisional application No. 61/120,478, filed on Dec. 7, 2008.

(51) Int. Cl.
*G01N 27/416* (2006.01)
*G01N 27/02* (2006.01)

(52) U.S. Cl.
USPC ........... 324/426; 324/425; 324/427; 324/432; 324/442; 205/341; 320/101

(58) Field of Classification Search
CPC .................................................. G01R 31/3648
USPC .......................... 320/101; 205/341; 324/426
See application file for complete search history.

(56) References Cited

U.S. PATENT DOCUMENTS

| 4,968,395 | A * | 11/1990 | Pavelle et al. ................. 205/704 |
| 7,325,392 | B2 | 2/2008 | Stancovski et al. |
| 2004/0007475 | A1 | 1/2004 | Stancovski et al. |
| 2004/0151957 | A1 | 8/2004 | Brooks et al. |
| 2006/0051659 | A1 | 3/2006 | Kelly et al. |
| 2006/0170397 | A1 | 8/2006 | Srinivasan et al. |
| 2007/0095673 | A1 | 5/2007 | Stancovski et al. |
| 2009/0101516 | A1 | 4/2009 | Suib et al. |
| 2009/0134037 | A1 | 5/2009 | Stancovski et al. |

OTHER PUBLICATIONS

"Atmel Launches Industry's Safest Battery Management Solution for Automotive and Industrial High-cell-count Li-Ion Battery Packs", *Atmel*, Oct. 7, 2009 (2 pages).

* cited by examiner

*Primary Examiner* — Edward Tso
*Assistant Examiner* — Ahmed Omar
(74) *Attorney, Agent, or Firm* — Mintz Levin Cohn Ferris Glovsky and Popeo, P.C.

(57) ABSTRACT

A system and method for controlling a power storage device through the Stimulation and Intensification of Interfacial Processes (SIIP) is provided. A signal generator can provide a low voltage sinusoidal AC signal across a battery terminal, or other reactor vessel, during charging and discharging states. For example, the battery/reactor vessel can be of Li-ion and NiMH designs, a fuel cell, a Zn—O cell, or other devices that have features of rechargeable batteries. The output of the signal generator (i.e., voltage, wave type, and frequency) can be controlled based on battery parameters (e.g., internal resistance, output power, temperature). The internal resistance of the battery can be reduced, and the discharge time can be increased. Elastic waves can also be provided to a battery/reactor vessel to stimulate the interfacial processes. The signal generator can be an integrated circuit which is packaged with the battery and can be powered by the battery.

8 Claims, 7 Drawing Sheets

STIMULATION AND INTENSIFICATION OF INTERFACIAL PROCESSES

CROSS-REFERENCE TO RELATED ACTIONS

This application claims the benefit of U.S. Provisional Application No. 61/120,478, filed on Dec. 7, 2008, which in incorporated herein in its entirety by reference.

BACKGROUND

Power storage devices can employ controls that perform simple functions to charge and discharge power to improve performance and longevity of the device. Improving the efficiency of batteries is of particular importance in view of the move to electric powered automobiles, and the adoption of portable computing technologies such as cellular telephones and portable data devices (i.e., music player, PND, notebook computers). Accordingly, there is a need to provide solutions to extend the performance of existing power storage technologies.

In electrochemical energy storage devices (i.e., batteries, fuel cells, and other such devices for transforming the chemical energy of a fuel into electrical energy) the overall performance of the device can be dependent on the mass transport to and away from the sites where the electron transfer reaction occurs. In general, mass transport can be impeded by effects such as polarization, memory effects, and hysteresis effects of a discharge. An improvement in any of these effects, or in any combination of these effects, can improve the mass transport within the power storage device, and accordingly, improve the performance of the power storage device.

It has been established that in many catalytic reactions, the rate of the reaction can be determined by processes occurring in close proximity to the interface. These processes can take place either before or after the catalytic reaction occurs. For example, an increase in the diffusion rate of a reacting species away for a catalytic site can increase the overall rate of the catalytic process. It is generally known that these interfacial processes can be advantageous for chemical reactors, gas masks and any other similar devices.

The implementation of interfacial processes can be extended to power storage devices. As is described below, it is possible to create or destroy interfacial catalytic sites via fast electron or ion transport. According, the control of such interfacial processes can impact the mass transport in electrochemical energy storage devices and provide for improved performance of the devices.

SUMMARY

In general, in an aspect, the invention provides an apparatus for extending the time to discharge an electrochemical device including an electrochemical device, an electrical load connected to the electrochemical device, and a signal generator connected to at least one terminal of the electrochemical device and configured to provide an electromagnetic input to the at least one terminal.

Implementations of the invention may include one or more of the following. The electrochemical device can be a NiMH electrochemical cell. The electrochemical device can contain at least one Lithium anode. The electrochemical device can be a fuel cell. The signal generator can provide a periodic (e.g., 1 mHz to 1 GHz) waveform to the at least one terminal. The signal generator can provide variable waveforms. An acoustic transducer can be electrically/mechanically (e.g., operably) coupled to the signal generator and can be configured to transmit elastic waves into the electrochemical device. The signal generator can be configured to provide electromagnetic input to the at least one acoustic transducer. The signal generator can be configured to provide electromagnetic signals to electrochemical device and the at least one acoustic transducer simultaneously.

In general, in another aspect, the invention can be a system for providing stimulation and intensification of interfacial processes to a reaction vessel. The system can include an input device connected to the reaction vessel, an electromagnetic signal generator, an electrode connected to the electromagnetic signal generator and located near (or touching) the reaction vessel, a memory device, and a processor programmed to receive information about the reaction vessel via the input device, calculate a control signal based on the information, and command the electromagnetic signal generator to output the control signal.

Implementations of the invention may include one or more of the following. The reaction vessel can contain an electrolyte. The input device can a transducer placed in contact with the electrolyte. More than one input device can be connected to the reaction vessel, and the processor can be programmed to receive information about the reaction vessel for each of the input devices and then calculate a control signal based on the information received from at least one of the input devices. At least one acoustic transducer can be connected to the electromagnetic signal generator and located on or near the reaction vessel. The control signal can be a periodic waveform and/or an impulse signal. The electrode can be in contact with the electrolyte.

In general, in another aspect, the invention provides a computer-readable medium having computer-executable instructions for performing a method including detecting a value of at least one parameter associated with the performance of a battery, calculating an interfacial stimulation control solution based on the value of the at least one parameter, and adjusting at least one interfacial stimulation control variable being supplied to the battery.

Implementations of the invention may include one or more of the following. The one parameter associated with the performance of the battery can be internal resistance, output current, output voltage and/or battery temperature. The one interfacial stimulation control variable can be frequency, amplitude, power per pulse, form factor of an electromagnetic pulse, and/or phase angle. The at least one interfacial stimulation control variable can be adjusted in a burst of predetermined intensity, frequency distribution and duration.

In accordance with implementations of the invention, one or more of the following capabilities may be provided. Controls for power storage devices (e.g., batteries, fuel cells, chemical reactors) can be created. The figures of merit characterizing a power storage device (e.g., yield, availability of charge, stability, reliability) can be improved. The output power of a storage device can be increased. The duration of steady state output of a power storage device can be increased. The time required to charge a power storage device can be decreased. The temperature of a power storage device during charge and discharge can be controlled. The risk of a battery fire can be reduced. These and other capabilities of the invention, along with the invention itself, will be more fully understood after a review of the following figures, detailed description, and claims.

DETAILED DESCRIPTION OF PREFERRED EMBODIMENTS

Figure 1:
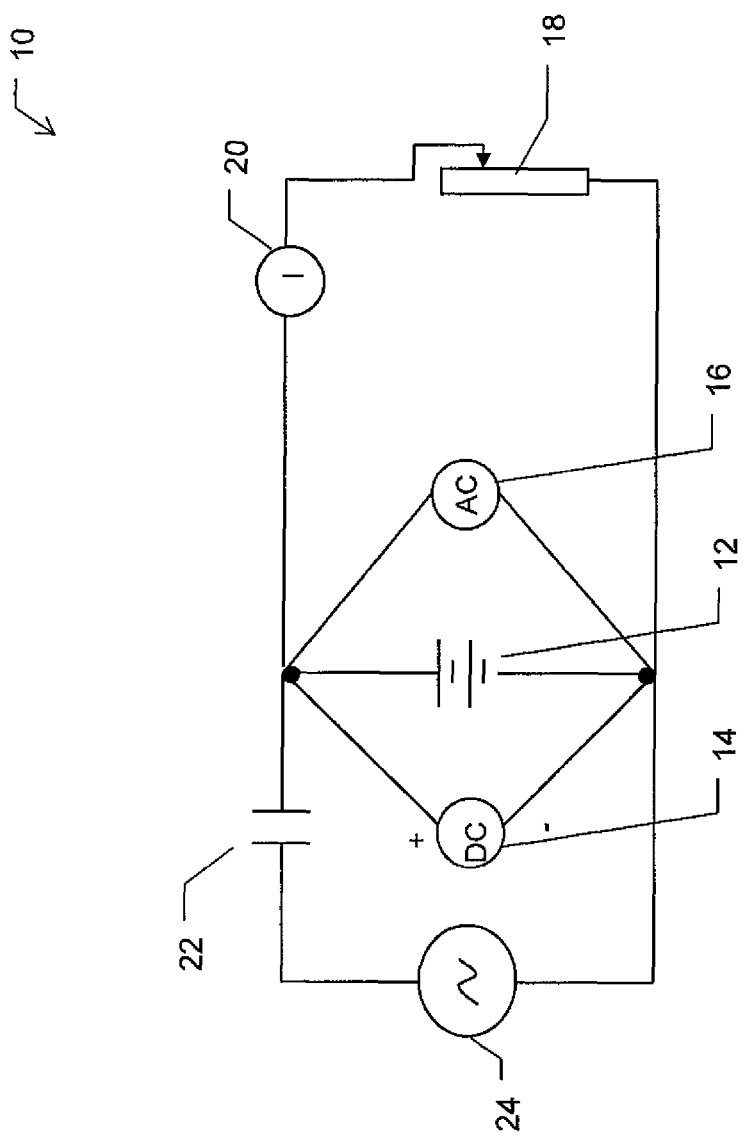
FIG. 1 is an exemplary circuit of a battery with interfacial stimulation and intensification.

Embodiments of the invention provide techniques for controlling a power storage device through the Stimulation and Intensification of Interfacial Processes (SUP). As an example, and not a limitation, a low voltage (e.g., 50 mV) sinusoidal AC signal (e.g., 60 Hz) can be input across battery terminals during charging and discharging states. The battery can be of Li-ion and NiMH designs. The battery can also be a fuel cell, a Zn—O cell, or other devices that have features of rechargeable batteries. The voltage, wave type, and frequency can be controlled based on battery parameters (e.g., internal resistance, output power, temperature). A parasitic inverter can receive power from the battery to produce the AC signal. The AC signal generator can be an integrated circuit which is packaged with the battery. These techniques are exemplary, however, and not limiting of the invention as other implementations in accordance with the disclosure are possible.

The Stimulation and Intensification of Interfacial Processes (SIIP) is an array of processes leading to the improvement in the performance of devices like batteries, fuel cells, zinc-air cells, and chemical reactors. The intensification of mass and charge transfer steps via the effect of external physical actions exerted at molecular level by the concerted action of electromagnetic waves and elastic waves, each type of physical action being broadcast by an adequate apparatus such as an electric or RF signal generator, with the effect of waves being monitored through the evaluation of the physical characteristics of the device. In general, the intensification of diffusion processes preceding or succeeding the charge transfer steps can lead to a decrease in the effects of interfacial polarization on the performance of the power storage device. Further, the increase in the concentration of charge transfer sites can lead to a decrease of the polarization effects associated with the kinetics of the step, as well as to the improvement of other characteristics of the power storage device (e.g., charging rate, degradation characteristics).

In an embodiment, the physical structure of the interfaces susceptible to the effect of the electromagnetic waves can include structures with an open porosity, such that the system allows the free flow of the fluids that are involved in the reaction. For instance, in a lead-acid battery, the structure of the electrodes can be designed in such a way as to maximize the diffusion to and from the electrode of the ionic species of interest. This idea can be extended to the operation of any other similar system (other types of batteries and fuel cells). Further, for the SIIP in catalytic reactors, the catalyst layer(s) can be acting as electrodes, because even the transient passage of an AC current will determine effects similar to those occurring at an electrified interface in a battery or fuel cell.

In an embodiment, the physical structure of the interfaces susceptible to the effect of the electromagnetic waves can include the presence of at least two types of phases in the system from the viewpoint of electric conductivity. An extreme situation is described by one phase being a metallic conductor (e.g., an electrode) and the other is an ionic conductor (e.g., an electrolyte). There are many other situations in which the SIIP effect can be activated at the interfaces between two different materials with different conductivities, such that the mutual solubility of the materials is low enough to allow the formation of an interface, as opposed to a layer of continuous variation in the phase composition. In general, the SIIP effect seems to be favored by the presence of at least one phase with mixed conduction (ionic and electronic).

In an embodiment, the physical structure of the interfaces susceptible to the effect of the electromagnetic waves can include a system wherein the mechanical coherence of the phases is sufficient to maintain the physical integrity under the influence of fast temperature changes, temperature gradients, fast variations in the flow of fluid passing through the system, as well as the influence of mechanical oscillations (e.g., sound waves) propagating through the system.

The SIIP effect can be additionally promoted in some embodiments by the inclusion in the phases of the system of particles, wires or sheets of materials acting as antennas or susceptors, with a high electrical or magnetic susceptance. Similarly, the application of turbionary fields can lead to stationary vortices promoting oriented depositions at interfaces. In general, the application of elastic (e.g., sound) waves can intensify the diffusional component of the overall mass and charge transfer reaction. In an example, an electric wave, symmetric or asymmetric, can be transmitted into the power storage device, while simultaneously applying an elastic wave in-phase with the electric wave, at a frequency which is a function of the frequency of the electric wave, and with an intensity optimized for the specific process under consideration. Other phase angle differences can be used, ranging from zero to 180 degrees. The value of the phase angle difference can be determined as a function of the target figures of merit of the performance of the power storage device subjected to SIIP.

In an embodiment, the electromagnetic waves can be applied in bursts, or continuously. The frequency range of these waves is generally dependant on the specific characteristics of the system to be subject to SIIP, and can be between situated between the frequency range characterizing long waves and microwaves. The effects of stationary waves, the skin effects accompanying the microwave radiation, the effects of the interaction between the effects at molecular level determined by the electromagnetic waves and the elastic waves can be considered in the optimization of the SIP process for particular applications.

In an embodiment, the real-time evaluation of the effect of SIIP on a system can be done via the measurement of the complex dielectric constant of the system or of a quantity derived from it (real, imaginary, module, phase angle etc). The optimal operation of the system under SIIP conditions can occur when the application of the electromagnetic and sound waves considers the calibration of the matrix of parameters describing the applied fields against the matrix of figures of merit relevant for the process to be intensified (e.g., reaction rate, charging rate of a battery, battery temperature, output voltage). The electronic unit serving as signal generator for the electromagnetic and elastic waves can be provided with a feedback capability, based on the real-time measurement of the physical characteristics of the system (e.g., complex dielectric constant, and correlating it with the frequency, intensity, phase (and phase angle difference) and burst duration of the applied electromagnetic and elastic waves).

As examples only, and not limitations, contactless SIIP and SIIP in installations with two, three, four and five electrodes as described below can be considered. Systems that employ more electrodes are conceivable as well.

Referring to FIG. 1, a circuit 10 for implementing SIIP is shown. The circuit 10 includes a battery 12, a DC voltmeter (e.g., a Fluke 289 Multimeter) 14, an AC voltmeter 16 (e.g., a Fluke 284 True RMS Multimeter), an electrical load 18, a variable resistor 20, a capacitor 22, and an AC power source (e.g., a transformer connected to the grid). As an example only, and not a limitation, in an embodiment the battery 12 is Li-ion battery, (i.e., a Kodak KLIC-8000, with a capacity of approximately 1780 mAh).

Figure 2:
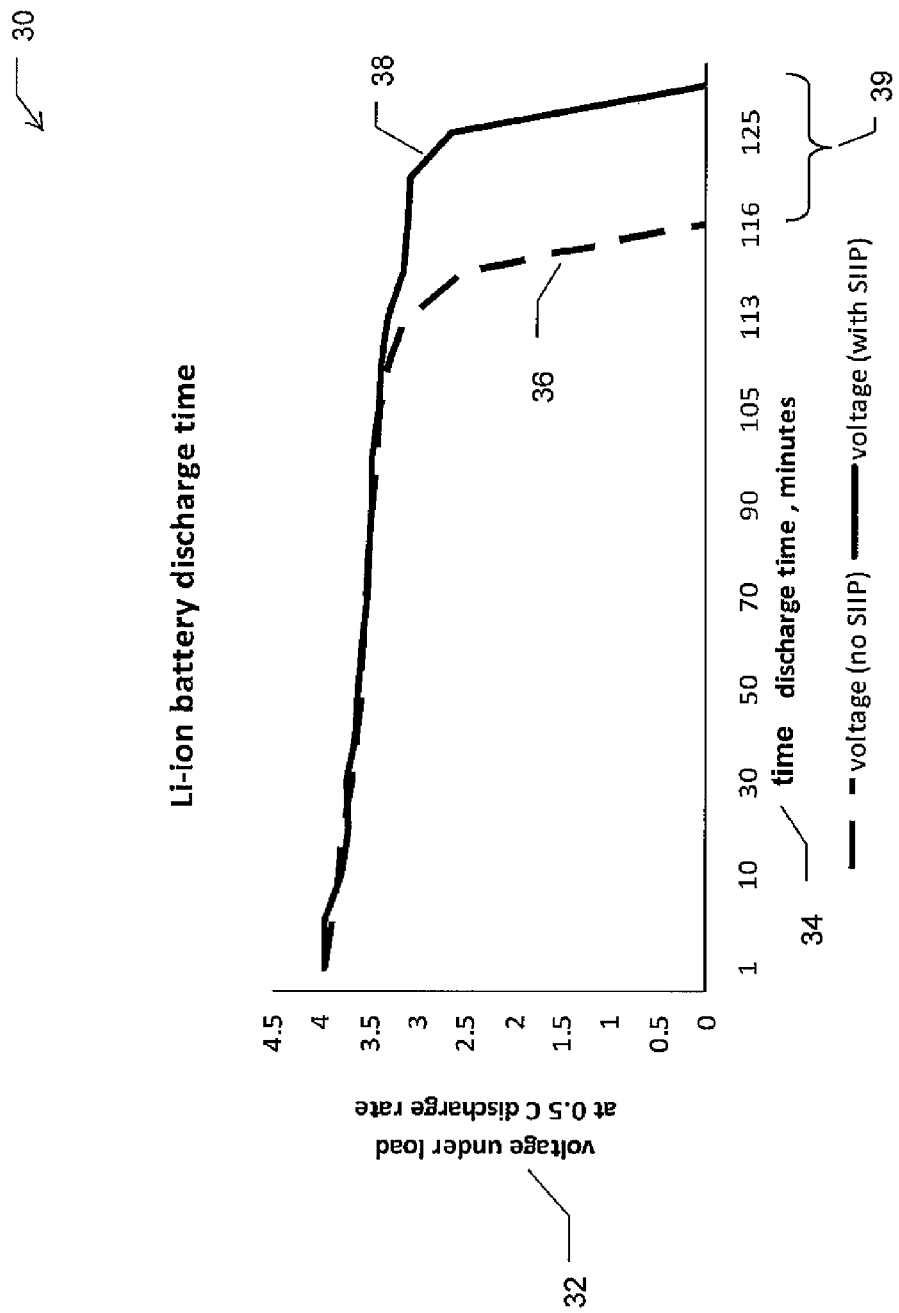
FIG. 2 is a graph of the DC voltage output of a Li-ion battery as a function of time with and without interfacial stimulation.

Referring to FIG. 2, with further reference to FIG. 1, an exemplary graph 30 of the voltage output from the battery 12 is shown. The graph 30 includes a y-axis 32 representing DC voltage at the battery 12 as measured by the DC meter 24, an x-axis 34 representing time (i.e., in minutes), a first data set 36 based on the output of the battery 12 without the SIIP provided by the AC power source 24, a second data set 38 based on the output of the battery 12 with the SIIP provided by the AC power source 24, and an time segment 39 representing the performance improvement of battery 12 with SIIP. The time segment 39 represents the extension in time to discharge the battery 12 when SIIP is applied. Experiments with Li-ion batteries, with an AC source 24 supplying a 50 mV sinusoidal signal at 50 Hz, have demonstrated a temporal improvement 39 in the range of 5%-20% of the total discharge time. These results are exemplary only, and not a limitation as other AC source 24 parameters may be used (e.g., voltages between 1 microvolt and 100 mV, at frequency ranges from 1 mHz to 1 GHz (electromagnetic waves), and the waveforms can include sinusoidal, square wave, triangular wave, asymmetric waveforms, white noise, impulses, and combinations of these). In an embodiment, elastic waves can be applied to the battery 12 in the range between 1 mHz and 100 kHz.

Figure 3:
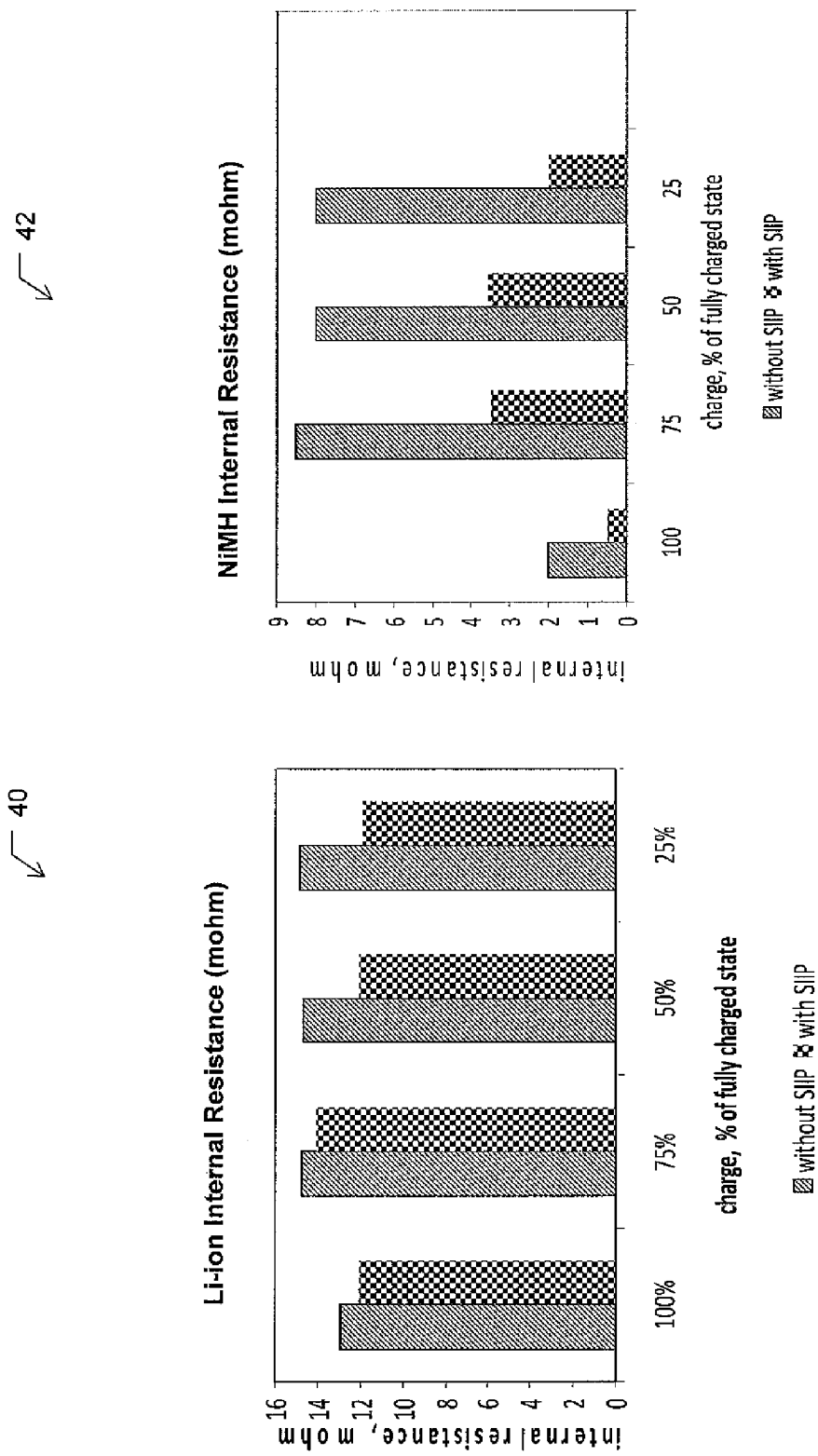
FIG. 3 is a graph of the internal resistance of Li-ion and NiMH batteries at various depletion stages, with and without Stimulation and Intensification of Interfacial Processes (SIIP).

Referring to FIG. 3, a graph 40 of the internal resistance of a Li-ion battery with and without SIIP, and a graph 42 of the internal resistance of a NiMH battery with and without SIIP are shown. Experiments were conducted on a Kodak KLIC-8000 Li-ion battery and an Energizer® AA NiMH battery, with an approximate output of 2000 mAh. As depicted on each of the graphs 40, 42, the internal resistance (mohm) of the batteries is plotted against percentage of charge (i.e., 100, 75, 50, 25) remaining in the battery. Each of the batteries was tested with and without the application of SIIP as described above (e.g., 50 mV at 50 Hz). In each case, the internal resistance was decreased when SIIP is applied. The decrease in internal resistance leads to battery performance improvements as is know in the art (e.g., higher pulse current, improved talk time).

Figure 4:
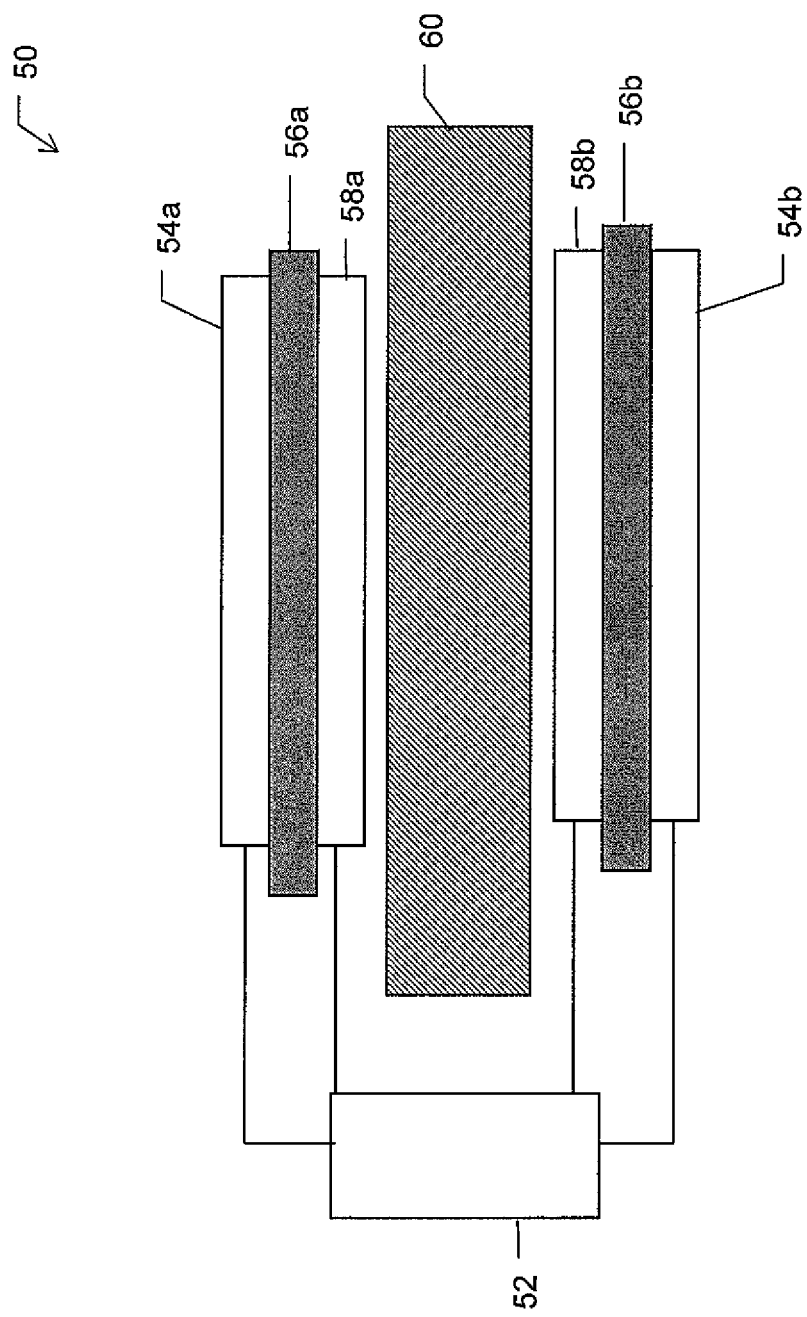
FIG. 4 is a block diagram of a system for contactless interfacial stimulation and intensification.

Referring to FIG. 4, a block diagram of a system 50 for contactless interfacial stimulation and intensification is shown. The system 50 is exemplary only and not a limitation. The system 50 includes a SIIP signal generator and data processing unit 52, two electrodes 54a, 54b, two insulators 56a, 56b, two acoustic transducers 58a, 58b, and a reactor enclosure 60. The SIIP signal generator 52 is operably connected to the electrodes 54a, 54b and the acoustic transducers 58a, 58b. The SIIP signal generator 52 can include a processor, memory and an input/output port for receiving/sending computer readable instructions. In general, the processing instructions in the SIIP signal generator can be stored in a computer readable medium in a computer readable memory, such as conventional hard disks, CD-ROM, DVDs, Flash ROMS, nonvolatile ROM, and RAM. In an embodiment, the SIIP signal generator is an integrated circuit that is packaged with a power storage device. This system is exemplary, however, and not limiting of the invention as other implementations in accordance with the disclosure are possible. The SIIP signal generator 52 can receive system parameters, calculate an interfacial stimulation control solution, and generate a variable signal to be transmitted to the electrodes 54a, 54b and acoustic transducers 58a, 58b.

In general, the electrodes 54a, 54b, function as antennas, and can be comprised of wire and/or conductive sheets configured to radiate electromagnetic energy into the reactor enclosure 60. The acoustic transducers 58a, 58b are configured to receive a control signal from the SIIP signal generator 52 and transmit an acoustic field within the reactor enclosure 60. The insulators 56a, 56b are configured to separate the transducers 58a, 58b from the electrodes 54a, 54b.

In an embodiment, the reactor enclosure 60 can be filled with a porous mix of materials that satisfy the conditions for the creation of SIIP-susceptible interfaces (e.g., the physical structure of the interfaces susceptible to the effect of the electromagnetic waves which were described above). This can include, for example, a fluidized bed reactor wherein SIIP can affect the catalytic processes therein.

The contactless embodiment of FIG. 4 can be extended to a two-electrode battery configuration. In this embodiment, the SIIP generator will have the same functional components, with the difference that the electrodes are in contact with the electrolyte within the battery, and the acoustic transducers can be placed outside the casing of the battery. The reactor enclosure 60 is the electrolyte of the battery. This embodiment is particularly suitable for retrofitting an existing battery installation.

Figure 5:
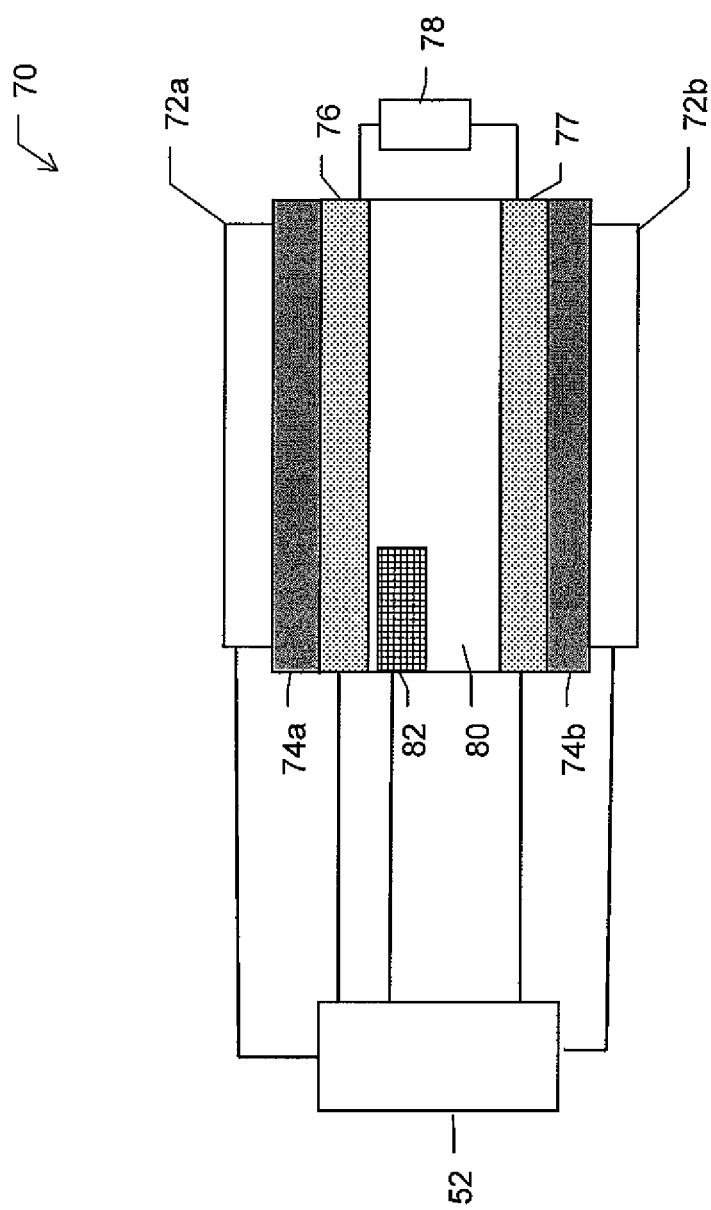
FIG. 5 is a block diagram of a three electrode system with interfacial stimulation and intensification.

Referring to FIG. 5, with further reference to FIGS. 1 and 4, a block diagram of a three electrode system 70 with interfacial stimulation and intensification is shown. The system 70 includes a SIIP signal generator and data processing unit 52, two acoustic transducers 72a, 72b, two insulators 74a, 74b, two electrodes 76, 77, an external electrical load 78, an electrolyte 80, and a reference electrode 82 disposed in the electrolyte 80. The SIIP signal generator 52 is operably connected to the electrodes 77, 76, 82 and the acoustic transducers 72a, 72b. The electrodes 76, 77 are placed in contact with the electrolyte 80. The electrode 82 is disposed within the electrolyte 80. The external electrical load 78 is operably connected to the electrodes 76, 77.

In operation, in an embodiment, the SIIP signal generator and data processing unit 52 is further configured to receive and process information from the reference electrode 82. In general, the reference electrode 82 can provide a stable voltage measurement to be a baseline with respect to the output voltage. In an embodiment, the reference electrode 82 can be made from an electronic conductor that is chemically stable under the conditions to which it is exposed. For example a thin layer of gold deposited by chemical vapor deposition (or another thin layer deposition technique), on an electrolyte in an area that is electrically insulated from the output electrodes 76, 77. This electrolyte can be a chemically suitable material with adequate thermal stability within the temperature range of the operation of the battery. An example of such an electrolyte is Nafion™, which is a proton conductor thermally stable up to about 175° C., according to its manufacturer (DuPont). The electrolyte 80 need not be limited to a static container (e.g., fuel cell, battery), as it can be configured as a reactor vessel through which electrolytic materials can flow.

For example, SIIP can be implemented in water purification, filtration processes and other chemical (e.g., catalytic) systems.

Figure 6:
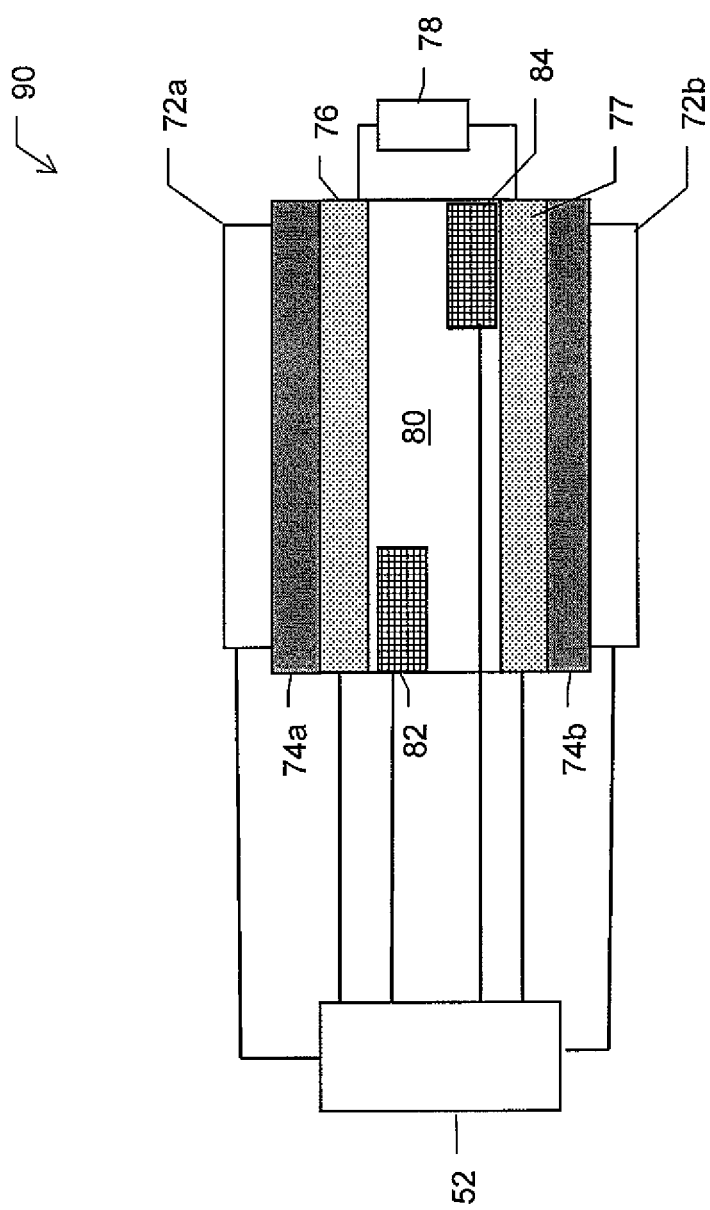
FIG. 6 is a block diagram of a four electrode system with interfacial stimulation and intensification.

Referring to FIG. 6, with further reference to FIGS. 1, 4 and 5, a block diagram of a four electrode system 90 with interfacial stimulation and intensification is shown. The system 90 includes a SIIP signal generator and data processing unit 52, two acoustic transducers 72a, 72b, two insulators 74a, 74b, two electrodes 76, 77, an external electrical load 78, an electrolyte 80, and two reference electrodes 82, 84 disposed in the electrolyte 80. The SIIP signal generator 52 is operably connected to the electrodes 77, 76, 82, 84 and the acoustic transducers 72a, 72b. The electrodes 76, 77 are placed in contact with the electrolyte 80. The electrodes 82, 84 are disposed within the electrolyte 80.

In operation, in an embodiment, the SIIP signal generator and data processing unit 52 is further configured to receive and process information from the reference electrodes 82, 84. The additional electrode 84 can provide an additional input to the SIIP data processing unit 52 regarding status of the electrolyte 80. The number of electrodes 82, 84 disposed within the electrolyte 80, or the corresponding reactor vessel, is exemplary only and not a limitation. A system can include additional electrodes (i.e., five, six, seven, eight) as required by a particular battery, or reactor vessel, configuration.

Figure 7:
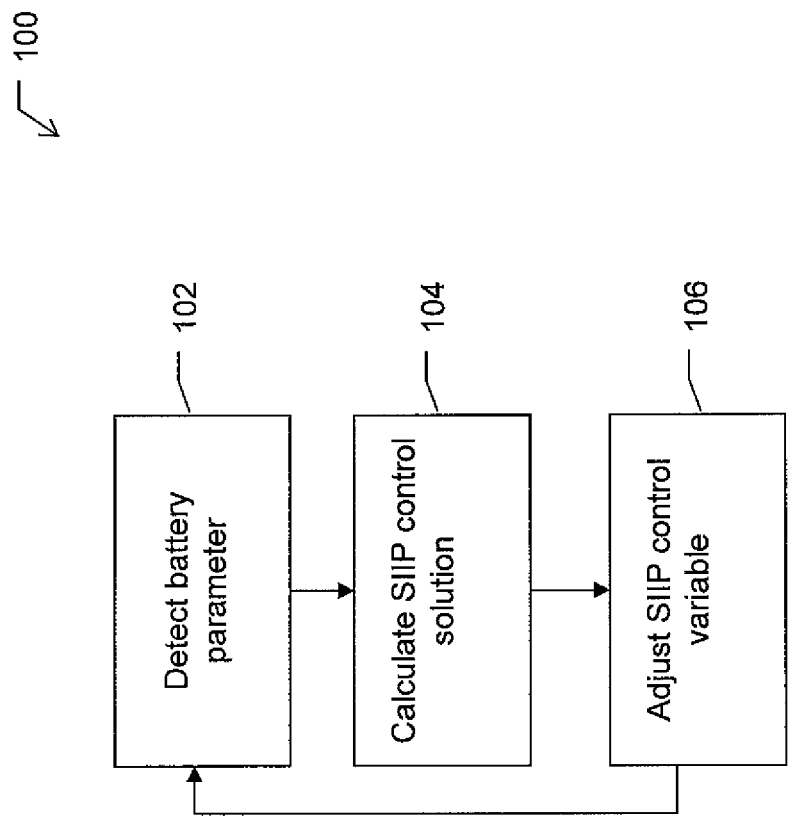
FIG. 7 is an exemplary flow chart of an interfacial stimulation and intensification control system.

In operation, referring to FIG. 7, with further reference to FIGS. 1, 4, 5 and 6, a process 100 for implementing interfacial stimulation and intensification using at least one of the disclosed systems 50, 70, 90 includes the stages shown. The process 100, however, is exemplary only and not limiting. The process 100 may be altered, e.g., by having stages added, removed, or rearranged.

At stage 102, a battery parameter can be detected. In an embodiment, the electrodes 82, 84 disposed within the electrolytic material 80 can detect electrochemical properties in the solution 80 (e.g., internal resistance, current, voltage, phase, impedance, first derivative of the time change of any of these variables, and combinations therein) and provide an input to the SIIP processor 52. Other parameters such as output voltage and battery temperature can also be determined. The battery parameters can be extended to the system in which the battery is a part of. For example, the battery parameters can include system information such as current talk time, time since recharge, time since the battery has been replaced. Each of these parameters can provide an input to the SIIP processor 52.

At stage 104, a SIIP control solution can be calculated. In an embodiment, the frequency and amplitude of the electromagnetic signal emitted from the electrodes 54a, 54b, 76, 77 can be increased or decreased. In an embodiment, the frequency and amplitude of the acoustic signal emitted from the acoustic transducers 58a, 58b, 72a, 72b can be increased or decreased. Other combinations and variations in electromagnetic and/or acoustic input can be used based on the nature of the electrolyte 80.

At stage 106, the SIIP control variable can be adjusted. The SIIP processor 52 is configured to provide input signals to the electric and acoustic transducers. For example, a SIIP processor 52 can provide a low voltage sinusoidal signal across the terminal of a NiMH battery. In an embodiment, the frequency, amplitude, power per pulse, form factor of the electromagnetic pulses, and/or phase angle relationship of the waves can be adjusted. The impact of the adjustments can be monitored in a closed-loop control via the detection processes at stage 102.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

SIIP can be utilized in existing catalytic fluidized bed reactors to increase the rate of the catalytic process via an increase in the concentration of the catalytic sites. For example, the contactless system 50 can be used in the processing of coal and other sulfur-containing materials.

In general, in the case of a fluidized bed reactor, an external electromagnetic field can be applied to the enclosure containing the reactor. The mixture of catalyst with a susceptor material is coated on grains of solid support, which can be placed inside the enclosure. The current of reacting fluids can be passed through the reactor while the external electromagnetic field is activating the catalyst. The action of the electromagnetic field can be coupled in some embodiments with the action of elastic waves (e.g., acoustic waves) transmitted into the enclosure.

The rate of many deposition processes can depend on the rate of the supply of the relevant charged species (e.g., ions) or other molecular species to the interface of interest, as well as on the rate of self-assembly of these species. This rate of supply is a strong function of the amount and direction of an electric current passing across the interface. In general, if the form, duration and intensity of the current crossing the interface in conjunction with the application of an elastic wave of a certain form and frequency are such as to lead to the deposition of template polymer chains or of other types o templates (crystals, for instance), the characteristics of the current and of the elastic wave can be selected in such a manner as to lead to the maximization of the yield of the depositions. This application of SIIP can be used in many filtration systems.

These examples are given for illustration purposes only, and are not intended to be limitations. Common to these examples is the implementation of external actions leading to the stimulation and intensification of some of the most critical steps of catalytic reactions, electrochemical reactions and other processes important in engineering, as, e.g, filtration. Different embodiments of catalytic systems (chemical reactors, catalytic converters), fuel cells, filtration devices (water filtration, gas treatment devices, catalytic filters, gas masks) can benefit from embodiments of SIIP described herein.

Further, while the description above refers to the invention, the description may include more than one invention.

What is claimed is:

1. A system for providing stimulation and intensification of interfacial processes to a reaction vessel, comprising:
   an input device operably coupled to the reaction vessel;
   an electromagnetic signal generator;
   at least one electrode operably coupled to the electromagnetic signal generator and disposed in proximity to the reaction vessel;
   a memory device; and
   a processor programmed to:
      receive information about the reaction vessel via the input device,
      calculate a control signal based on the information; and
      command the electromagnetic signal generator to output the control signal.

2. The system of claim 1 wherein the reaction vessel contains an electrolyte.

3. The system of claim 2 wherein the input device is a transducer disposed in contact with the electrolyte.

4. The system of claim 1 comprising a plurality of input devices operably coupled to the reaction vessel, wherein the processor is programmed to receive information about the reaction vessel for each of the input devices and calculate a control signal based on the information received from at least one of the input devices.

5. The system of claim 1 comprising at least one acoustic transducer operably coupled to the electromagnetic signal generator and disposed in proximity to the reaction vessel.

6. The system of claim 1 wherein the control signal is a periodic waveform.

7. The system of claim 1 wherein the control signal is an impulse signal.

8. The system of claim 2 wherein the at least one electrode is in contact with the electrolyte.

\* \* \* \* \*